(12) United States Patent
Gulick, Jr. et al.

(10) Patent No.: US 6,405,464 B1
(45) Date of Patent: Jun. 18, 2002

(54) LENTICULAR IMAGE PRODUCT PRESENTING A FLIP IMAGE(S) WHERE GHOSTING IS MINIMIZED

(75) Inventors: Stephen Gulick, Jr., Rochester; David J. Snider, Spencerport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/606,701

(22) Filed: Jun. 29, 2000

Related U.S. Application Data

(63) Continuation-in-part of application No. 08/882,903, filed on Jun. 26, 1997, now Pat. No. 6,177,953.

(51) Int. Cl.⁷ ............................................. G03B 25/02
(52) U.S. Cl. ................................................... 40/454
(58) Field of Search ........................... 40/454; 353/32; 359/455, 463; 396/307

(56) References Cited

U.S. PATENT DOCUMENTS

| | | | | |
|---|---|---|---|---|
| 5,581,402 A | | 12/1996 | Taylor | |
| 5,724,758 A | * | 3/1998 | Gulick, Jr. | 40/454 |
| 5,850,580 A | * | 12/1998 | Taguchi et al. | 396/330 |
| 5,886,816 A | * | 3/1999 | Faris | 359/464 |
| 6,177,953 B1 | * | 1/2001 | Vachette et al. | 348/59 |
| 6,237,264 B1 | * | 5/2001 | Gulick, Jr. | 40/454 |
| 6,239,068 B1 | * | 5/2001 | Tutt | 503/201 |

* cited by examiner

*Primary Examiner*—Paul N. Dickson
*Assistant Examiner*—Benjamin A Pezzlo
(74) *Attorney, Agent, or Firm*—William F. Noval

(57) ABSTRACT

According to a feature of the present invention, there is provided a lenticular image product comprising:

a lenticular lens element having an array of lenticules; and
a lenticular image associated with said lenticular lens element said lenticular image including at least first and second adjacent flip images of different content having a transition region between said first and second images to minimize ghosting.

3 Claims, 3 Drawing Sheets

LENTICULAR IMAGE PRODUCT PRESENTING A FLIP IMAGE(S) WHERE GHOSTING IS MINIMIZED

CROSS REFERENCE TO RELATED APPLICATIONS

This application is a continuation-in-part application of the U.S. patent application Ser. No. 08/882,903, filed Jun. 26, 1997, now U.S. Pat. No. 6,177,953 B1, issued Jan. 23, 2001.

FIELD OF THE INVENTION

This invention relates in general to lenticular imaging and relates more particularly to a lenticular image product presenting a flip image (s) where ghosting is minimized.

BACKGROUND OF THE INVENTION

Lenticular images include an array of cylindrical lenses (or lenticules) in a lenticular material and a sequence of spatially multiplexed images that are viewed through the lenticular material so that different ones of the multiplexed images are viewed at different angles by the viewer. One image effect produced by the lenticular image is a depth or stereoscopic image where the lenticules are oriented vertically and one eye views one image of a stereo pair or sequence from one angle and the other eye views another image from the stereo pair. Another image effect is a motion image where different images on a motion image sequence are viewed by both eyes, while changing the angle at which the image is viewed. In this image effect, the lenticules can be oriented in either the horizontal or vertical direction and the lenticular material is rotated about the long axis of the lenticules. Other effects that combine these two effects, or form collages of unrelated images that can be viewed from different viewing angles can be provided. Other effects include zoom images (one or more images are zoomed from wide angle to narrow angle views), flip images (images of different scenes which may or may not be related), animation images (images simulate motion of an inanimate object), computer generated images, or combinations of different effects.

Lenticular images are formed by decomposing each of several images into image elements equaling the number of lenticules in the lenticular lens element. A set of image elements are multiplexed, one image element for each of the several images, for each lenticule. Thus, if there are ten images and one hundred lenticules, each of the ten images are decomposed into one hundred image elements, and a set of ten image elements, one for each image are associated with each lenticule.

The multiplexed images can be generated as a digital image file and scan printed directly onto a lenticular lens element having a recording layer or printed as a master print which is used to contact print on print media which is laminated to a lenticular lens element or which forms a recording layer of the lenticular lens element.

Typically, two to thirty images can be multiplexed into a single lenticular image.

A problem of ghosting arises when a lenticular image presents a flip image. Flip images are images of different scenes, which may or may not be related, that appear in succession as the viewer moves left to right relative to the image or as the lenticular image product is rotated about a lenticular axis. These flip images could be depth images, 2-D images, layered images, etc.

An A/B flip lenticular image 10 as depicted in FIG. 1, is a single physical image in which two different scenes are visible in succession as the viewer transitions from left to right relative to the image. In FIG. 2, Scene A is illustrated by a whole, champagne bottle 14 and Scene B (box 16) is the bottle 18 exploding. The two scene flip is often referred to as an A/B flip. Flip images are not necessarily limited to two scenes.

The ideal flip image would transition distinctly from one scene to the next with complete extinction of scene 1 prior to the appearance of the next scene. In reality, depending on the image content, the quality of the lenticular material, alignment precision of the film to the lenticular material, etc., complete extinction does not always occur prior to the next image coming into view. The viewer thus sees Image A completely and a less distinct version of Image B in the background until the viewer moves laterally to a point where only Image B is seen. The undesirable appearance of the less distinct image is referred to as ghosting.

Producing a two (2) scene flip image is accomplished by creating a composite digital file incorporating both images. Each image is digitally composed of a number of lines equal to the total number of lenticules required for the width of the final image.

The composite image is printed on film with one or more lines of image data (image element) for each scene printed under each lenticule. When displayed behind the lenticular material, sequential lines from a particular view will fill each lenticule. Thus, as all the lenticules are viewed simultaneously, a particular scene is projected to the viewer. In a flip image, the scene data are repeated a number of times to provide the same image as the viewer moves laterally for a short distance until the transition point to the next image is reached. At this point, the image "flips" to the next image.

As shown in FIG. 3 assuming twenty (20) lines of image data are printed under each lenticule for a 2-flip image, each lenticule would have 10 lines of Scene A (lines 1–10 for lenticule No. 1) and 10 lines of Scene B (lines 11–20 for lenticule No. 1). Each successive lenticule has a progressive segment of images A and B printed until the whole scene is completed. As shown, successive lenticules 100', 100, 100", have respective lines 1'–20', 1–20, 1"–20".

For the purpose of this discussion, assume that the image projection of each lenticule to the viewer at a particular distance from the flip image provides each eye with views that are 3 lines apart. One eye perceives line 5 while the other eye perceives line 8. No problem occurs, if the physical factors of lenticular quality and image lenticular alignment is within specifications, until the viewer moves to a position where lines 8 and 11 are seen. Line 11 is of Image B while line 8 projects Image A. Now ghosting is evident until the viewer receives lines 11 and 14. This effect also occurs at the transition between lenticules. While viewing lines 19 and 20 of image B, line 1" of the Image A under lenticule 1" is also visible, creating ghosting.

Similarly, while viewing lines 1 and 2 of Image A, line 20' of Image B under adjacent lenticule 1' is visible, creating ghosting.

U.S. Pat. No. 5,581,402, issued Dec. 3, 1996, inventor Taylor, discloses a method for producing an improved stereoscopic image in which adjacent lenticular image element sets are separated by image elements that are black or of another color, that are of varying brightness level, or that are printed with different exposure levels to improve stereoscopic viewing. The stereoscopic images are of the same scene. This patent does not address the ghosting problem of flip lenticular images.

There is thus a need to provide a lenticular image product having flip images that eliminates the ghosting problem.

SUMMARY OF THE INVENTION

The present invention provides a solution to the problems discussed above.

According to a feature of the present invention, there is provided a lenticular image product comprising:

a lenticular lens element having an array of lenticules; and a lenticular image associated with said lenticular lens element said lenticular image including at least first and second adjacent flip images of different content having a transition region between said first and second images to minimize ghosting.

ADVANTAGEOUS EFFECT OF THE INVENTION

The invention has the following advantages.

1. A lenticular image product is provided in which ghosting between flip images is minimized or eliminated.
2. A lenticular image product is provided creating a pleasing transition effect between flip image.

DETAILED DESCRIPTION OF THE INVENTION

The flip image is created by printing data of each individual image under each lenticule. As the viewer moves laterally, relative to the image, the individual images progressively come into view. Unfortunately, as the viewer moves while looking at one image, a ghost of the next image is seen. This effect may be subtle or startling depending on several factors including the contrast of Image A to Image B.

To solve the ghosting problem, this invention is intended to eliminate the pixel interference from one image to another by isolating these images. A number of methods could be used as follows:

1. Transition frames of data, composed of a background image that is complementary to both images, could be inserted between the images. (See FIGS. 4 & 5).

Figure 1:
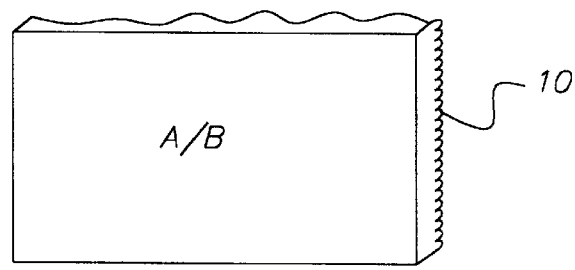
FIGS. 1–3 are diagrammatic views useful in explaining the background of the present invention.
Figure 2:
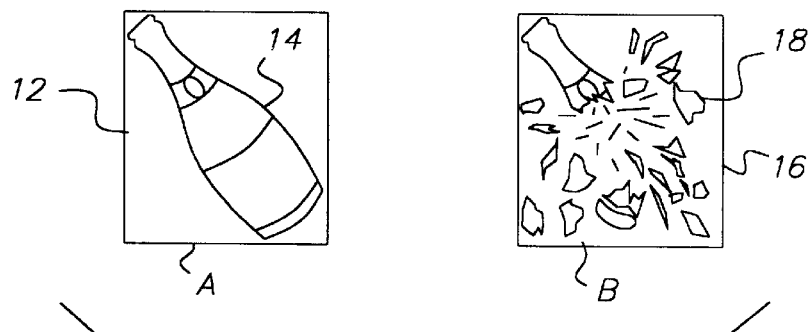
Figure 3:
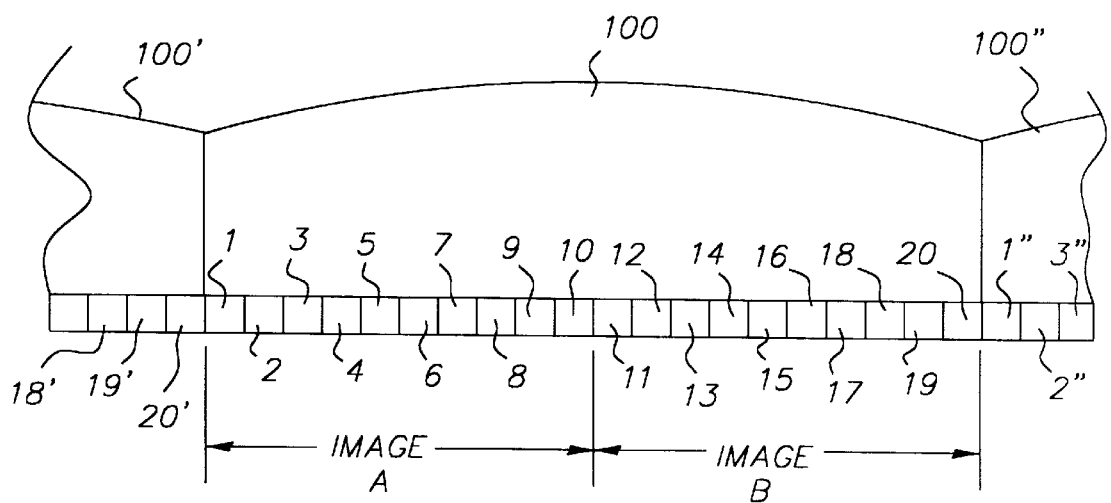
Figure 4:
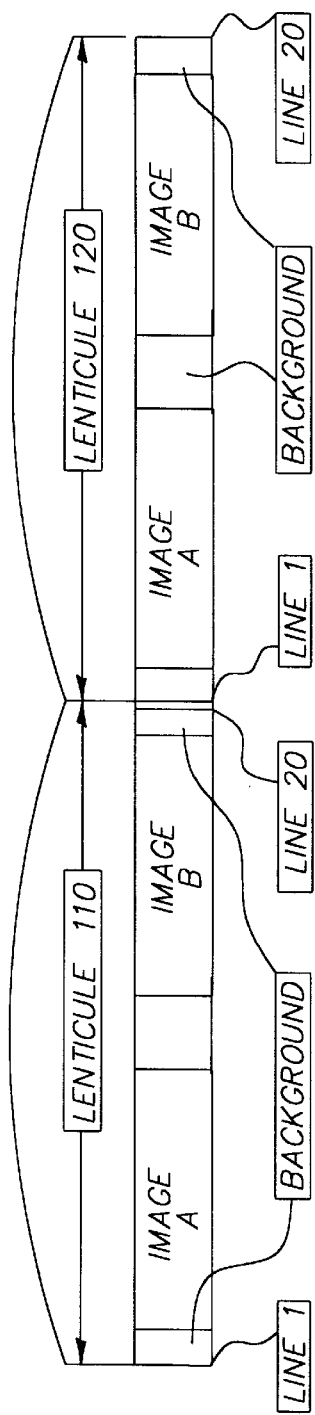
FIGS. 4–7 are diagrammatic views useful in explaining the present invention.
Figure 5:
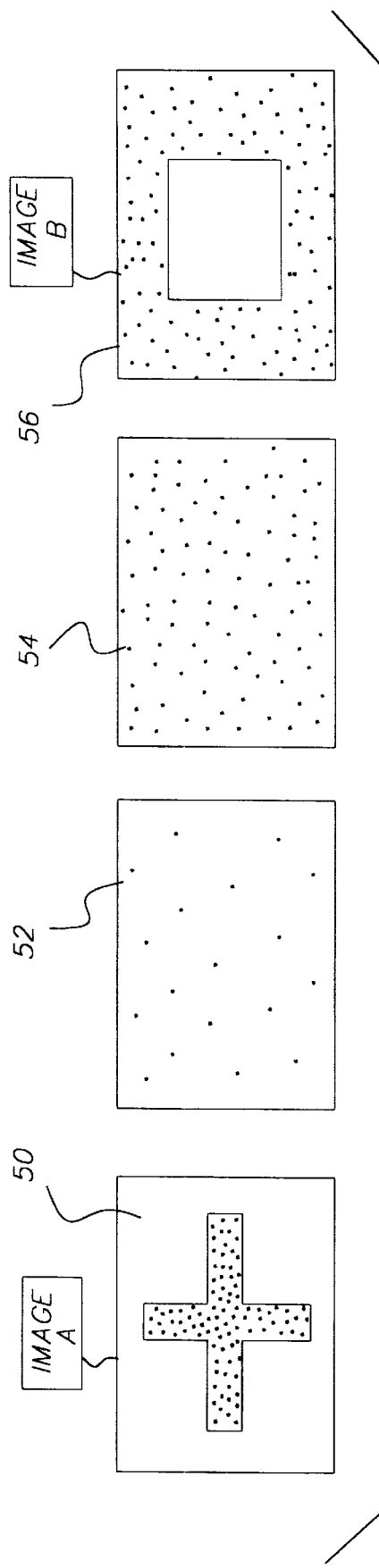

To solve the above ghosting problem as shown in FIG. 4, lines of data for transitioning from one image to the next could be designed and included in the digital file. In the above discussion, lines 8–10 could be composed of transition data such as a complementary color background that would create a transitioning effect for moving from one scene to the next. A transition effect is also needed under each lenticule at the start of Image A and/or at the end of Image B to provide a transition from the end of one image to the start of the next.

A dissolved effect could be created. This effect could be combined with the background transition effect if desired. The data in lines 8–10 could be changed in intensity, or opacity to fade slowly away while lines 11–14 could have similar changes in the opposite direction thus creating the effect of Image A fading out as Image B smoothly comes into view. Thus, as shown diagrammatically in FIG. 5, Image A, (box 50) dissolves into Image B (box 56) with varying opacity background (boxes 52 & 54). Both methods described above would also substantially reduce, if not eliminate the ghosting effect that occurs: 1. from slight misalignment of the image at an angle relative to the lenticular, or, 2. from lenticular tolerances that result in pixel interference from adjacent images; or 3. from the line spread finction inherent in film which tends to "blur" lines which are very close together.

Figure 6:
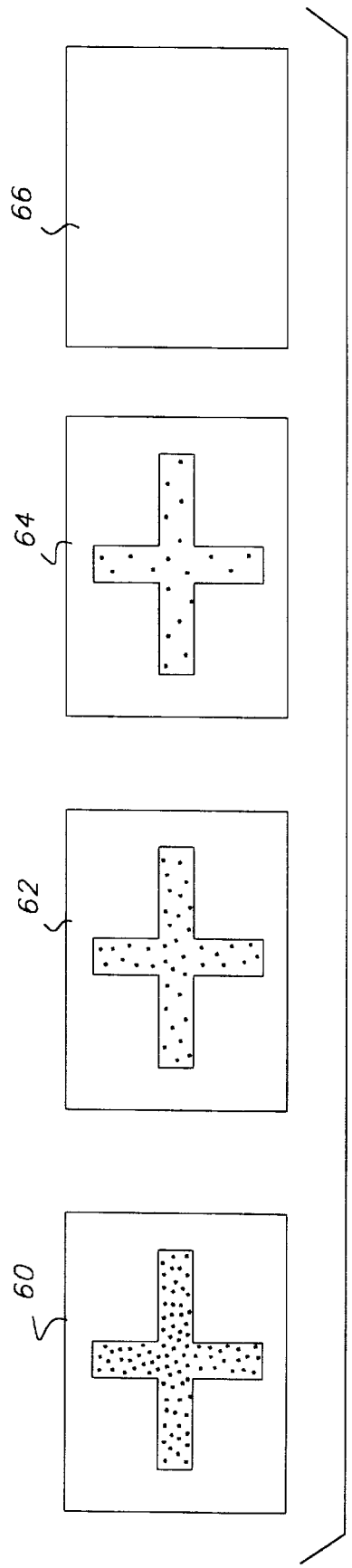

2. Changing the photographic characteristics of a few end frames of one or more flip images could provide a dissolve effect for a pleasing transition between successive images. As shown in FIG. 6, the image of box 60 gradually dissolves, (boxes 62 and 64) to box 66. The image intensity, opacity, contrast, brightness, etc. could be successively altered in these end frames of one or more images. The end frames could include the last few frames of one image and the first few frames of the next image.

Figure 7:
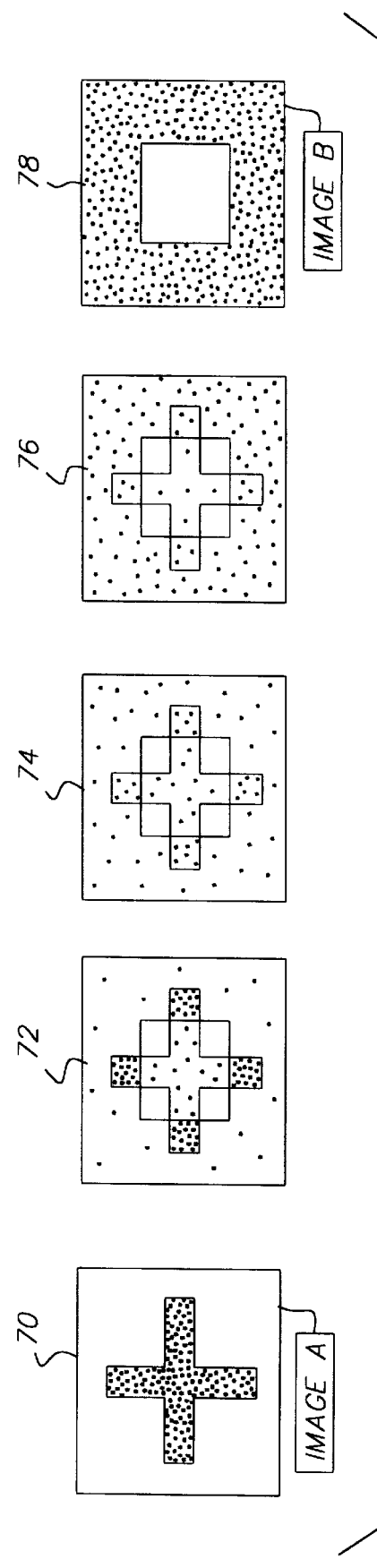

3. Transition frames could be implemented with gradual color shifts of areas of one image to the color in corresponding areas in the next image. FIG. 7 illustrates a color shift from Image A (70) to Image B (78). Transition frames (72,74,76) can be implemented with gradual color shifts of areas of one image to the color in corresponding areas in the next image. This illustration shows a transition of the background from white to dark gray and Image A changing from a black cross to a white square. The parts of the cross in Image A that will be background in Image B slowly changes from black to dark gray in succeeding frames. The area of the cross in Image A that will be included in Image B changes from black to white.

Other possible ways to achieve less ghosting within a scene include negative canceling, contrast canceling, color canceling, dilution through spacial canceling etc.

The invention has been described in detail with particular reference to certain preferred embodiments thereof, but it will be understood that variations and modifications can be effected within the spirit and scope of the invention.

PARTS LIST

10 flip lenticular image
12 scene A
14 lenticular image
16 scene B
18 image action
50–56 images
60–66 images
70–78 images
100,100', 100" lenticules
110,120 lenticules

What is claimed is:

1. A lenticular image product comprising:

a lenticular lens element having an array of lenticules; and a lenticular image associated with said lenticular lens element said lenticular image including at least first and second adjacent flip images of different content having a transition region between said first and second images to minimize ghosting.

2. The lenticular image product of claim 1 wherein said lenticular image includes images 1 to n decomposed into image elements equaling the number of lenticules in said lenticular lens element with a set of image elements from each image being associated with each lenticule, wherein said first and second flip images constitute a plurality of consecutive identical images of each said image separated by at least one transitional image.

3. The lenticular image product of claim 1 wherein said transition region presents a view of one or more of the following effects to minimize ghosting;

color of background, change in scene intensity, dissolve, color shift, negative canceling, contrast canceling, color canceling, dilution through spacial canceling.

* * * * *